US010402548B2

(12) United States Patent
Yamaguchi et al.

(10) Patent No.: US 10,402,548 B2
(45) Date of Patent: Sep. 3, 2019

(54) AUTHENTICATION SYSTEM AND METHOD (71) Applicant: The University of Tokyo, Bunkyo-ku, Tokyo (JP)

(72) Inventors: Rie Yamaguchi, Tokyo (JP); Hideki Nakayama, Tokyo (JP); Tatsuya Harada, Tokyo (JP); Daisuke Sakamoto, Tokyo (JP)

(73) Assignee: The University of Tokyo, Bunkyo-ku, Tokyo (JP)

( * ) Notice: Subject to any disclaimer, the term of this patent is extended or adjusted under 35 U.S.C. 154(b) by 392 days.

(21) Appl. No.: 15/506,198

(22) PCT Filed: Aug. 24, 2015

(86) PCT No.: PCT/JP2015/073676
§ 371 (c)(1),
(2) Date: Jun. 14, 2017

(87) PCT Pub. No.: WO2016/031751
PCT Pub. Date: Mar. 3, 2016

(65) Prior Publication Data
US 2017/0286648 A1    Oct. 5, 2017

(30) Foreign Application Priority Data
Aug. 25, 2014 (JP) ................. 2014-170964

(51) Int. Cl.
*G06F 21/30* (2013.01)
*G06F 21/31* (2013.01)
*G06F 21/32* (2013.01)

(52) U.S. Cl.
CPC ............. *G06F 21/30* (2013.01); *G06F 21/31* (2013.01); *G06F 21/316* (2013.01); *G06F 21/32* (2013.01)

(58) Field of Classification Search
CPC ........ G06F 21/30; G06F 21/32; G06F 21/316; G06F 21/31
See application file for complete search history.

(56) References Cited

U.S. PATENT DOCUMENTS

2003/0158815 A1* 8/2003 Yoshida .................. G06F 21/31
705/50
2005/0097320 A1* 5/2005 Golan ..................... G06F 21/40
713/166

(Continued)

FOREIGN PATENT DOCUMENTS

JP    2003-067340 A    3/2003
JP    2003-196566 A    7/2003

(Continued)

OTHER PUBLICATIONS

International Search Report and Written Opinion dated Nov. 10, 2015, issued in corresponding International Application No. PCT/JP2015/073676, filed Aug. 24, 2015, 12 pages.

*Primary Examiner* — Nelson Giddins
(74) *Attorney, Agent, or Firm* — Christensen O'Connor Johnson Kindness PLLC (57) ABSTRACT

An object of the present invention is to provide an authentication system and method which can reduce a burden on a user while ensuring security by using a combination of a plurality of authentication methods. A method for authentication of the present invention comprises the steps of: obtaining a first authentication performance value for each transaction based on initial input information at a transaction; determining whether or not additional authentication is required for authentication of a person by comparing the first authentication performance value and the authentication performance threshold value required for authentication of a person; presenting, if the additional authentication is required, a plurality of authentication methods from which one authentication method or a combination of authentication methods can be selected so as to satisfy an additional (Continued)

authentication performance value obtained using the first authentication performance value and the authentication performance threshold value; and obtaining a second authentication performance value based on additional input information using the one or more authentication methods selected from the plurality of presented authentication methods, and determining whether to authenticate by comparing the additional authentication performance value and the second authentication performance value.

15 Claims, 7 Drawing Sheets

(56) References Cited

U.S. PATENT DOCUMENTS

| | | | | |
|---|---|---|---|---|
| 2011/0225625 | A1* | 9/2011 | Wolfson | H04L 63/08 726/1 |
| 2013/0097673 | A1* | 4/2013 | Meehan | G06Q 20/341 726/4 |
| 2014/0172707 | A1* | 6/2014 | Kuntagod | G06Q 20/40145 705/44 |
| 2016/0012412 | A1* | 1/2016 | Scanlon | H04L 63/0892 705/44 |

FOREIGN PATENT DOCUMENTS

| | | |
|---|---|---|
| JP | 2005-107592 A | 4/2005 |
| JP | 2007-514333 A | 5/2007 |
| JP | 2009-237643 A | 10/2009 |
| JP | 2010-067124 A | 3/2010 |
| JP | 2011-054120 A | 3/2011 |
| WO | 2007/066480 A1 | 6/2007 |

* cited by examiner

| Authentication methods | Authentication performance value (Points) |
|---|---|
| Historical data authentication | Calculate at each transaction |
| Terminal authentication | 100 |
| ID + password | 100 |
| One time password | 150 |
| Biometric authentication 1 (Fingerprint authentication) | 200 |
| Biometric authentication 2 (Vein authentication) | 200 |
| Biometric authentication 3 (Face authentication) | 200 |
| Motion patterns from wearable | 100 |
| Authentication performance Threshold value | 300 |

Please select one authentication method from the first group and
the second group respectively,
enter information, and click submit button

1st Group

- ID+Password
- One time password

2nd Group

- Fingerprint authentication
- Vein authentication
- Face authentication

Fig. 5

Please select one authentication method from the following authentication methods,
enter information, and click submit button

- ID＋Password
- One time password

- Fingerprint authentication
- Vein authentication
- Face authentication

Fig. 6

Please select two authentication methods from the following authentication methods,
enter information, and click submit button

- ID＋Password
- One time password

- Fingerprint authentication
- Vein authentication
- Face authentication

Fig. 7

Please select authentication methods from the following authentication methods so that total points exceed 300 points, enter information, and click submit button

- ID+Password(100)
- One time password(150)
- Fingerprint authentication(200)
- Vein authentication(200)
- Face authentication(200)

AUTHENTICATION SYSTEM AND METHOD

TECHNICAL FIELD

The present invention relates to an authentication system and method.

BACKGROUND OF THE INVENTION

With the spread of the Internet and advancements in mobile technology, the demand for authentication to verify the identity of a person is increasing in e-commerce, online banking, online games, and other various transactions over the Internet.

Authentication methods can be broadly classified into those with three different factors. The first factor (knowledge) is to present the information which is known only to that person, and examples include a password, and a combination of secret question and answer. The second factor (possession) is to present information which is owned only by that person, and examples include a one-time password, IC card, and a table of random numbers. The third factor (physical and behavioral characteristics) is to identify a person by biometrics authentication and the like, and examples include vein authentication, fingerprint authentication, voiceprint authentication, and iris authentication. Incidentally, the distinction between the first and second factors is not always clear, and a one-time password, for example, may be classified into the first factor.

The most typical user authentication is an authentication method which uses a user name (ID) and a password, however, it is recognized that this authentication method is not always reliable and is particularly vulnerable to the list type account hacking and phishing sites. "Username (ID)+password" may be combined with other authentication methods. For example, according to the risk-based authentication which is widely adopted in the in the actual authentication system, user's environmental information (personal computer and network being used, IP address and ISP therethrough) and behavioral patterns are analyzed, and if the environment and behavioral patterns are different than usual and a possible fraudulent transaction is determined, additional authentication (pre-registered watchword entry or entry of one-time password sent by e-mail, for example) is conducted.

Conducting user authentication by combining a plurality of authentication methods, particularly multi-factor authentication using a combination of authentication methods with different factors, is effective in improving security. In the present specification, "a combination of a plurality of authentication methods" also includes a combination of authentication methods with the same factor, but "multi-factor authentication" refers to a combination of a plurality of authentication methods with different factors. There have been a number of proposals to conduct person authentication by combining a plurality of authentication methods, and some of them will be illustrated.

Patent Document 1 (JPA2003-67340) discloses an authentication selection system comprising a combination generating portion for generating one authentication or a combination of authentication using at least one authentication means to authenticate a person; an integrated authentication performance calculating portion for calculating authentication performance for the authentication or the combination of authentication; and an authentication means selecting portion for selecting one authentication or a combination of authentication to meet target performance required for authenticating a person using at least one authentication means. Authentication performance of the authentication means can be represented, for example, by a false rejection rate (FRR) which is a ratio of false rejection (FR) by which a person, who is the registrant himself, is authenticated to be as another person who is not the registrant himself; and by a false acceptance rate (FAR) which is a ratio of false acceptance (FA) by which a person, who is another person being not the registrant himself (another person) is authenticated to be as the registrant himself. The authentication performance (FRR and FAR) of each authentication means is updated by analyzing log data obtained by the actual authentication. Regarding the authentication means selecting portion, the authentication means is selected by the system from a predetermined combination of the authentication means in accordance with a table, and the combination does not change at each transaction.

Patent Document 2 (JPA2005-107592) relates to an authentication method selecting system in which an authentication method for a user is selected from a predetermined authentication methods when providing different kinds of transactions to the user. Authentication performance is evaluated by a misidentification rate which is expressed by a power of 10, $10^{-4}$ for example. The misidentification rate is a probability of a user being misidentified as another person. The authentication performance becomes higher as the misidentification rate becomes lower. The misidentification rate for a combination of authentication methods is obtained by multiplying a misidentification rate of each of authentication methods. When combining an authentication method 1 (a misidentification rate of $10^{-4}$) and an authentication method 2 (a misidentification rate of $10^{-3}$), a misidentification rate of $10^{-7}$ can be obtained by $10^{-4} \times 10^{-3}$. When a transaction to be conducted is designated, an authentication method selecting portion of the authentication method selecting system selects one or a combination of authentication methods such that the misidentification rate is lower than a user-dependent misidentification rate for the transaction.

Patent Document 3 (JPA2009-237643) discloses an authentication system comprising a first authentication device which acquires a first authentication level; a second authentication device which acquires a second authentication level; and an authentication determining device which authenticates based on a comparison between a predetermined value and a sum of the first authentication level and the second authentication level. According to this system, authentication of a person is performed based on a sum of authentication levels obtained by a plurality of authentication devices so that the minimum required authentication accuracy can be ensured even if authentication levels of some of the plurality of authentication devices are low. If an elapsed time from previous authentication is short, authentication levels may easily exceed a threshold value by weighting the authentication level of each authentication device based on the historical information of the past authentication, so that the convenience is further enhanced.

When considering security, the user's point of view is also important. Many questionnaire survey results show that the users place emphasis on the usability of the authentication system while having an interest in the security of the system. Generally, an attempt to improve security impairs usability. Ensuring security without burdening users is an issue.

Due to the spread of the Internet, various online transactions are conducted and historical date for each transaction can be accumulated. Inventors of the present invention have been considering user authentication which is conducted without requiring a user to perform any authentication procedures at a transaction using such data.

From the standpoint of the user, it would be ideal if authentication is conducted at the system side without requiring the user to perform any authentication procedures. However, in reality, for most of the authentication, it would be difficult to ensure security by using only the historical data. It may be necessary to conduct authentication together with other authentication methods. In this regard, it is considered that flexibility is given to the user in selecting an authentication method which is used together with historical data to reduce a burden on the user.

Patent Document 4 (JPA2003-196566) discloses an authentication process in which an authentication level of a user is determined prior to an authentication process based on behavioral patterns of the user. This idea is similar in that the behavioral pattern as historical data is used, but according to Patent Document 4, authentication methods are predetermined corresponding to each authentication level which is determined in accordance with four stages A to D, and not selected by the user.

SUMMARY OF THE INVENTION

An object of the present invention is to provide an authentication system and method which can reduce a burden on a user while ensuring security by using a combination of a plurality of authentication methods.

An authentication system of the present invention comprises storage means for storing a plurality of authentication methods and authentication performance values thereof; initial authentication performance value obtaining means for obtaining a first authentication performance value for each transaction based on initial input information at the transaction; additional authentication performance value obtaining means for determining whether or not additional authentication is required by comparing said first authentication performance value and a predetermined authentication performance threshold value required for authentication of a person, if the additional authentication is required, obtaining an additional authentication performance value based on said first authentication performance value and said authentication performance threshold value; additional authentication menu presenting means for presenting a plurality of authentication methods and allowing selecting one authentication method or a combination of authentication methods from the plurality of authentication methods to satisfy said additional authentication performance value; and authentication determining means for obtaining a second authentication performance value based on additional input information using said one or more authentication methods selected from the plurality of authentication methods presented by said additional authentication performance presenting means, and determining whether or not to authenticate by comparing said second authentication performance value and said additional authentication performance value. The present invention may be provided as a computer program for causing a computer to operate as the above means.

In one aspect, the authentication system comprises a historical database, and the first authentication performance value comprises an authentication performance value obtained based on the input information at each transaction and historical information obtained from the historical database. The historical data accumulated and stored in the historical database comprises user's behavioral data obtained from the user terminal and log data for transactions. A typical example of the historical data includes purchase history of goods.

In one aspect, the input information includes identification information of the user terminal, the historical data authentication includes terminal authentication which uses identification information of the user terminal included in the historical information, and the authentication performance value for the historical data authentication includes the authentication performance value of the terminal authentication.

In one aspect, if the plurality of authentication methods other than the historical data authentication include an authentication method whose authentication performance value can be obtained based on the initial input information, the first authentication performance value obtained based on the initial input information includes such authentication performance value obtained based on the initial input information.

In one aspect, part or all of the authentication performance values of the plurality of authentication methods are changeable. Particularly, the authentication performance value for the historical data authentication is dynamic and calculated at each transaction. The authentication performance value for the historical data authentication is updated by updating the historical data and varies depending on a transaction and a user. With respect to the authentication performance values of the other authentication methods, suppose that the authentication method is "ID+password" for example, a predetermined authentication performance value is generally assigned to every users but the authentication performance value may be temporarily set lower if leak occurred.

In one aspect, part or all of the authentication performance values of the plurality of authentication methods may vary depending on a user. The authentication performance value may be set to a different value depending on a user. For example, with respect to a multi-modal authentication method using physical characteristics, the precision of modal authentication may differ depending on a user. For example, if there are a user whose fingerprint patterns are easily forged and a user whose fingerprint patterns are hardly forged, a fingerprint authentication performance value of the latter may be set higher than that of the former.

In one aspect, the authentication performance threshold value required for authentication of a person may be changed. For example, the authentication performance threshold value may be set lower if a product to be purchased is a low-price product. The authentication performance threshold value may be set lower by comparing with the past historical data to determine if the present transaction is the same as a usual purchase for example. The authentication performance threshold value required for authentication of a person may be changed by comparing the value of the present transaction and the past historical database. As an extreme example, the authentication performance threshold value may be set to zero in case of a usual purchase of a cheap product. Incidentally, the authentication system of the present invention may allow a store to take the risk of authenticating a person even if the authentication threshold value required for authentication of the person is not satisfied provided that a product to be purchased is a low-price product.

A method for authentication of the present invention comprises the steps of: obtaining a first authentication performance value for each transaction based on initial input information at a transaction; determining whether or not additional authentication is required for authentication of a person by comparing the first authentication performance value and the authentication performance threshold value required for authentication of a person; presenting, if the additional authentication is required, a plurality of authentication methods from which one authentication method or a combination of authentication methods can be selected so as to satisfy an additional authentication performance value obtained using the first authentication performance value and the authentication performance threshold value; and obtaining a second authentication performance value based on additional input information using the one or more authentication methods selected from the plurality of presented authentication methods, and determining whether to authenticate by comparing the additional authentication performance value and the second authentication performance value. The present invention may be provided as a computer program for causing a computer to execute the above steps.

In one aspect, the first authentication performance value includes an authentication performance value of historical data authentication obtained based on input information at each transaction and historical information obtained from the historical database. In one aspect, the first authentication performance value includes an authentication performance value of terminal authentication. In one aspect, the first authentication performance value includes an authentication performance value obtained based on the initial input information for an authentication method other than the historical data authentication.

According to the present invention, by presenting a plurality of authentication methods to the user and allowing the user to select an authentication, the user can choose of his/her free will a combination of authentication methods within the presented range, thereby ensuring the users flexibility. For example, the user can choose an authentication method which is easily available to the user, and authentication can be conducted without selecting an authentication method which the user does not wish to use. An authentication method to be used can be changed at every transaction and the present invention is different from the conventional authentication systems in that the user can often change the previously selected authentication methods. An authentication method may be selected at a provider side of the authentication system. For example, if security of a particular authentication method is decreased for some reasons, the authentication performance value of such authentication method may be lowered or authentication may be conducted by using other authentication methods without using such authentication method. If a new authentication method becomes available, it can easily be added to the authentication system. Even if the number of authentication methods increases, the user can select an available authentication method from a plurality of authentication methods of his/her own will so that no further burden is placed on the user.

With the spread and improved performance of mobile devices such as smartphones, it is considered that the number and types of authentication methods which can be used at the user side without burdening the user will increase so that the user will be able to select various available authentication methods from the device at hand. According to the present invention, the authentication performance threshold value required for authentication of a person is predetermined, the first authentication performance value obtained based on the initial input information at each transaction can be designed to include the authentication performance value of historical data authentication which is obtained based on input information at each transaction and historical information obtained from the historical database, and part (or all depending on situations) of the authentication performance threshold value may be supplemented without any particular authentication procedure by the user, such that an amount of additional input information required for the user to authenticate is adequately eliminated, thereby reducing a burden on the user.

DETAIL DESCRIPTION

Figure 1:
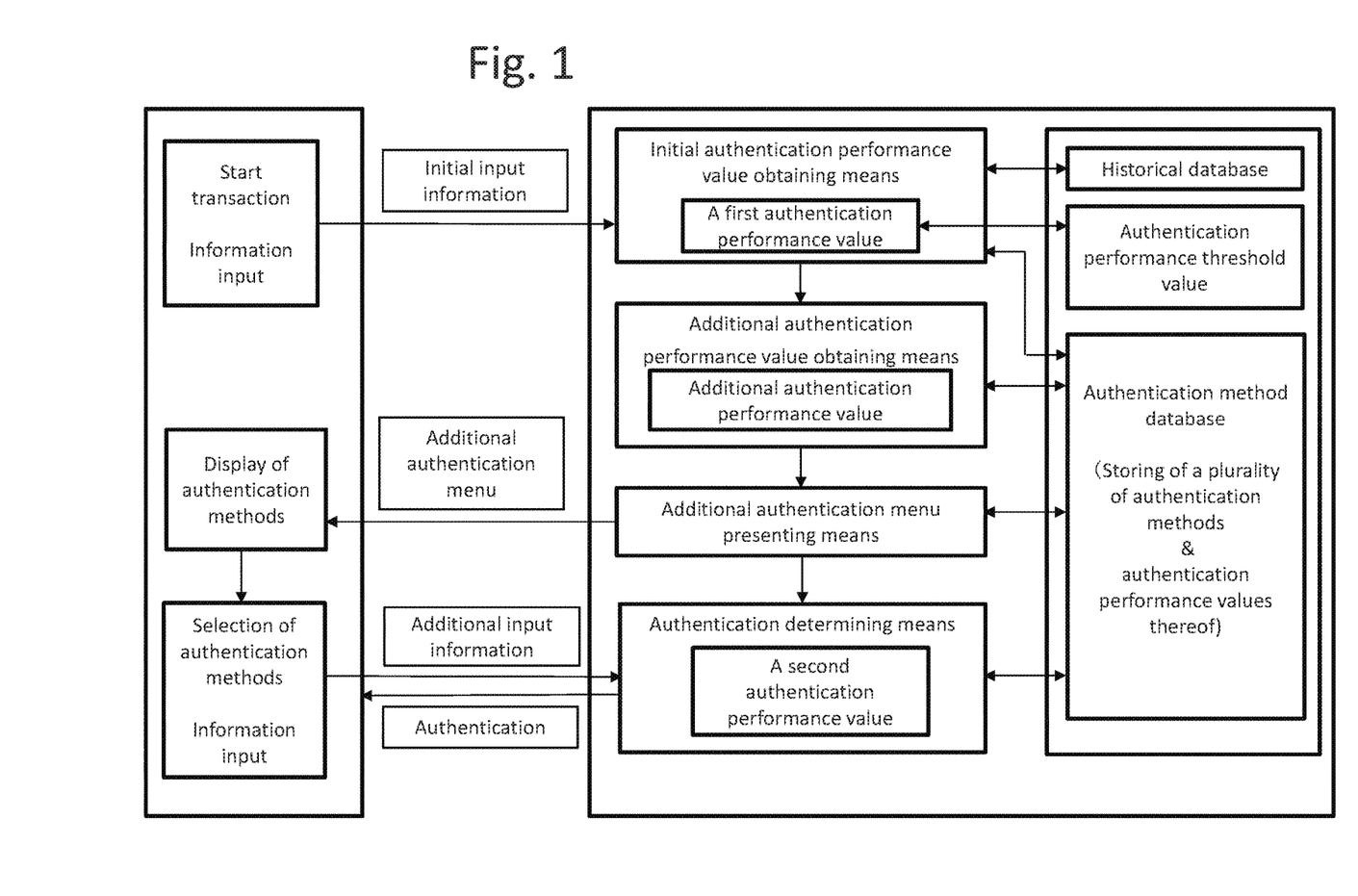
FIG. 1 is a block diagram showing an authentication system in accordance with an embodiment of the present invention.

Referring to FIG. 1, an overall configuration of an authentication system according to the present embodiment will be described. The authentication system comprises an user-side client terminal and an authenticator side server system. Both the client terminal and the sever system are comprised of a computer and can communicate through a computer network such as the Internet. The computer comprises basic elements such as an input unit, a memory unit, an arithmetic unit, an output unit, a display unit, a communication function and the like.

Examples of the client terminal include mobile computers (smartphones, mobile phones, PDAs, tablets, wearables with a communication function such as Bluetooth and Wi-Fi, and the like) and personal computers (desktops, laptops, notebooks and the like). In addition to the above basic elements of the computer, the client terminal may include a GPS function and various sensing functions such as an acceleration sensor, an angular velocity sensor, a geomagnetic sensor and the like. Configuration of the input unit is not limited to those with character entry from a keyboard or keypad but may be provided with image input means and audio input means. The client terminal is not limited to a terminal owned by a user but may include computers installed in a store for example.

FIG. 1 shows the server system represented by a single block but the computer system for the server system may be comprised of a plurality of linked computer systems provided by a plurality of entities.

The memory unit of the authentication system comprises a historical database, an authentication method database storing a plurality of authentication methods and authentication performance values for each authentication method, and a predetermined authentication performance threshold value required for person authentication. The memory unit of the authentication system stores information (ID, password, fingerprint, vein, face and the like, for example) which is to be compared with the information entered from the user terminal. This is omitted in FIG. 1 because it is well known that the authentication system requires the information to be compared with the information entered from the user terminal.

With respect to a sales transaction for example, historical information of the historical database comprises information which covers all purchasing patterns for each user. Such information comprises information which specifies purchasing patterns associated with identification information identifying a user, specifically purchase objects (goods or services), purchase places, prices, purchase times, time and date of purchase, a day of the week, and so forth. The historical database further includes login time at the entry of a user name and password for example, logout time, duration of login and the like on any sites (online shopping malls, online stores, online games and the like). The historical database may include identification information of the user terminal and location information for the past transactions. The historical database is constantly updated.

An authentication method database will be explained. An authentication performance value is a value which represents a level/degree of authentication performance. The rate of false identification rate used in Patent Document 1 and the misidentification rate used in Patent Document 2 may be used as the authentication performance value. Such authentication performance value may be points obtained being converted from the rate of false identification rate and the misidentification rate. The authentication performance value obtained by a combination of a plurality of authentication methods may be obtained by multiplication as disclosed in Patent Document 2 or addition as disclosed in Patent document 3 depending on an authentication performance value which is used for calculation.

Figure 2:
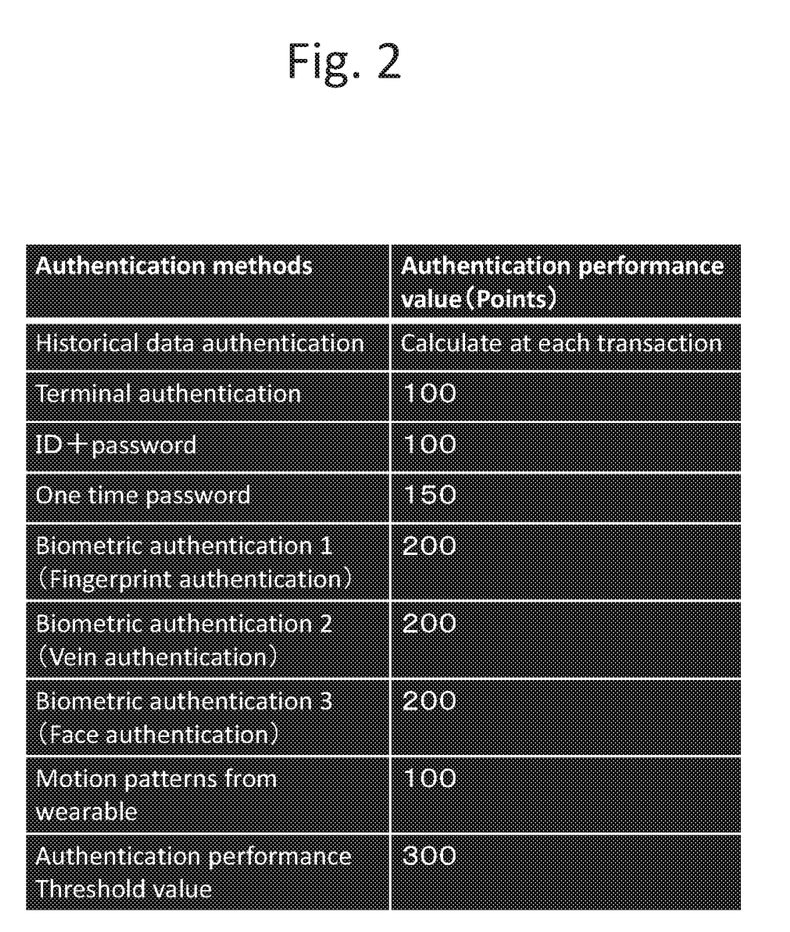
FIG. 2 shows a table illustrating an embodiment of an authentication method database which stores authentication methods and authentication performance values thereof.

The authentication method database is illustrated in FIG. 2. To simplify the explanation, converted points are used as the authentication performance value. According to an example shown in FIG. 2, historical data authentication, terminal authentication, ID+password, one time password, biometrics authentication 1 (fingerprint authentication), biometrics authentication 2 (vein authentication), biometrics authentication 3 (face authentication), and motion patterns from wearable terminal are stored, and 100 points, 100 points, 150 points, 200 points, 200 points, 200 points, 100 points are assigned respectively in order, other than the historical data authentication. With respect to points for the historical data authentication, calculation of points for the historical data authentication is performed at each transaction at the server side to obtain the points. The terminal authentication may be regarded as a part of the historical data authentication as it uses the past historical data, as will be described later. The motion patterns from the wearable as historical information may be stored at a server of a wearable terminal provider, for example and are provided online to the server of the authentication system from the server of the wearable terminal provider.

The authentication methods shown in FIG. 2 are examples and any other authentication methods can be adopted. For example, a comprehensive expression "historical date authentication" is used here but an individual authentication method such as location information or behavioral patterns and their authentication performance values may be provided. The terminal authentication may be regarded as authentication means of the authentication methods (location information, behavioral patterns and the like) similar to login time and date and etc. As the information obtained by the user terminal such as mobile computers (smartphones, mobile phones, PDAs, tablets, wearables and the like), surrounding information such as Wi-Fi and Bluetooth, motions of mouse, browsing history of websites, swiping manners and the like may be used for authentication. According to the conventional authentication system, the authentication method mainly uses the information such as biometric authentication and the like but according to the authentication methods of the present embodiment, all behavioral logs of user can be used for authentication, which facilitates enhancing flexibility in selecting an authentication method by the user and improving convenience.

The memory unit of the authentication system stores an authentication performance threshold value which is required for person authentication. According to FIG. 2, 300 points are set as the authentication performance threshold value. A level of the authentication performance threshold value can be adequately set by the ordinary skilled person in the art in accordance with the level of security for the transaction, an empirical rule and the like. The authentication performance threshold value may vary depending on the subject of the transaction. A degree of the authentication performance threshold value corresponds to the degree of authentication performance values for respective authentication methods so as to compare with an integrated authentication performance value obtained by combining a plurality of authentication performance values.

The authentication methods shown in the table of FIG. 2 are examples and can be adequately selected by the ordinary skilled person in the art from many authentication methods existing at that time. The authentication performance values (points) for each authentication method, or weighting, can be adequately set by the ordinary skilled person in the art in accordance with the level of security for the transaction, an empirical rule and the like.

Authentication methods which can be adopted in the present invention comprise part or all of any authentication methods included in any of the first factor, the second factor, and the third factor discussed in the background of the invention and the historical data authentication. The historical data authentication includes any authentication utilizing the historical data which includes login time information, location information, behavioral information and the like. The historical data authentication may include the risk-based authentication and the terminal authentication. For example, according to the terminal authentication, the identification information of the user terminal (PC, mobile terminals such as smartphones, mobile phones and the like) is compared with the identification information of user terminal in the past historical information. If a new authentication method becomes available, it may be added to the authentication method database with an appropriate authentication performance value (points) being set.

According to one aspect, part or all of the authentication performance values of authentication methods stored in the storage means or database are changeable. In particular, the authentication performance value of the historical data authentication is dynamic and can be calculated for each transaction. The authentication performance value of the historical data authentication is updated by updating the historical data and may vary for each transaction and each user.

With respect to the authentication performance values of other authentication methods, suppose that the authentication method is "ID+password" for example, a predetermined authentication performance value is generally assigned to all users but the authentication performance value may be temporarily set lower if leak occurred. The authentication performance values of the authentication methods may vary due to external factors (frequent occurrence of attacks on a particular server, for example) as well as the information (the past trends of many users) related to the user.

According to one aspect, part or all of the authentication performance values of the authentication methods can be changed for each user. Regarding the authentication performance value of each authentication method, different weighting may be employed depending on each user. For example, if there are a user whose fingerprint patterns are easily forged and a user whose fingerprint patterns are hardly forged, a fingerprint authentication performance value of the latter can be set higher than that of the former.

An authentication system comprises initial authentication performance value obtaining means for obtaining a first authentication performance value for each transaction based on initial input information at the transaction; additional authentication performance value obtaining means for determining whether or not additional authentication is required by comparing said first authentication performance value and a predetermined authentication performance threshold value required for authentication of a person, if the additional authentication is required, obtaining an additional authentication performance value based on said first authentication performance value and said authentication performance threshold value; additional authentication menu presenting means for presenting a plurality of authentication methods and allowing selecting one authentication method or a combination of authentication methods from the plurality of authentication methods to satisfy said additional authentication performance value; and authentication determining means for obtaining a second authentication performance value based on additional input information using said one or more authentication methods selected from the plurality of authentication methods presented by said additional authentication performance presenting means, and determining whether or not to authenticate by comparing said second authentication performance value and said additional authentication performance value.

The initial input information at the start of the transaction may include various information. For example, the initial input information may typically include a credit card number, a card holder name, CV code, and any combinations thereof in case of credit card payment. The initial input information may further include a product name or service name to be purchased by the credit card, supplier name, quantity, price, time and date and the like.

Generally, the initial input information at the start of the transaction can be any identification information to initial the transaction, and name (full name, user name, nickname and the like), number/symbol (user ID given by nation or organization, and any other number/symbols associated with historical database), and biometrics information (fingerprint, vein, face, iris and the like) may be considered.

The initial input information may not be unique information directly associated with a user if it can indirectly identify the user by using the historical data. For example, suppose that a particular user is purchasing a particular product at a particular store at a particular time, if the user can be identified from items such as store identification information, time, purchased product and the like by comparing with the historical information of the historical database, such items solely may be used as the initial input information.

In one aspect, initial authentication performance value obtaining means obtains a first authentication performance value based on the initial input information at the transaction and the information obtained from the historical database. Thus, the first authentication performance value comprises an authentication performance value obtained based on the initial input information at the transaction and the historical information obtained from the historical database. A degree of the authentication performance value based on the historical information should correspond with a degree of predetermined authentication performance values for respective authentication methods (except historical data authentication).

The authentication performance value of the historical data authentication may depend on the contents of the transaction. A method for calculating the first authentication performance value based on the initial input information at each transaction and information obtained from the historical database will be explained based on a case where a user "X" is purchasing a product "A" at an online store "a" by a credit card.

As the initial input information, information (credit card number, full name, for example) which may be directly entered by the user, user "X" (who is identified by user-entered information), product "A" and online store "a" may be identified. The database of the authentication system stores historical purchase data of user "X" using the credit card, and the historical purchase data comprise a product name, store name, time and date, number of pieces purchased, and purchase price, for example.

The following information can be extracted from the historical database for example.

User "X" purchased product "A" at online store "a" "M" times during a specified period (in the past 1 year for example).

User "X" purchased product "A" at the other store "N" times during a specified period (in the past 1 year for example).

User "X" purchased product "B" (similar to product "A") at online store "a" "m" times during a specified period (in the past 1 year for example).

User "X" purchased product "B" (similar to product "A") at the other store "n" times during a specified period (in the past 1 year for example).

The following information can be extracted from the historical database for example.

User "X" purchased product "A" at online store "a" "M" times during a specified period (in the past 1 year for example).

User "X" purchased product "A" at the other store "N" times during a specified period (in the past 1 year for example).

User "X" purchased product "B" (similar to product "A") at online store "a" "m" times during a specified period (in the past 1 year for example).

User "X" purchased product "B" (similar to product "A") at the other store "n" times during a specified period (in the past 1 year for example).

The first authentication performance value can be calculated by using purchase times M, N, m, n as parameters and weighting the parameters M, N, m, n, for example. For example, with respect to purchase at stores other than the identical store, weight is set to "0" and the first authentication performance value is calculated according to purchase times "M". For example, purchase times "M" is classified into three stages where 50 points, 100 points, and 150 points are assigned to each stage. Further, with respect to purchase at stores other than the identical store, weight is set to "0"

and weighing is performed according to a time period between the last purchase and the present purchase at the identical store.

When considering the purchase at other stores, the similarity of purchasing patterns is calculated in some way and may be incorporated into the first authentication performance value. More generally, comparing the purchasing patterns of the present transaction with the purchasing patterns obtained from the historical database, converting into numerical form by the parameters and weights, calculating an index which represents closeness to the past history in accordance with concepts such as similarity, degree of correlation, distance and the like, and obtaining an authentication performance value (points) corresponding to the index.

The historical data authentication may include the user terminal authentication. The historical database includes identification information for the user terminal which was used by the user "X" for the past purchase. When calculating the first authentication performance value based on the initial input information at each transaction and the information obtained from the historical database, an additional points may be added or weight may be set to 1 if the present purchase uses the same user terminal, and on the other hand, points may be subtracted or weight may be set to less than 1 (inclusive of 0) if the present purchase uses a different user terminal.

The above explanation for calculation of the first authentication performance value is based on the case where the user "X" is purchasing the product "A" at the online store "a" by using the credit card, but regarding person authentication for online games, the first authentication performance value may be obtained based on the historical information by using login information for the game sites or location information as the initial input information.

For example, when the historical information indicating that all logins by a user "Y" were made using a home IP is obtained according to the past historical data, if the present login is being made using an address other than the home IP, an authentication performance value of the historical data authentication is set to 0 for example, and 300 points may be required as an additional authentication performance value for example. It is possible to determine whether or not the user Y is logging in from home if the past logins were made using an IP address, which is assumed to be of a home PC, or if it can be assumed that the user Y is at home from GPS information of the smartphone of the user Y. In the latter case, if terminal authentication is conducted from identification number of the smartphone, 100 points are given to an authentication performance value of the historical data authentication and 200 points may be requested as an additional authentication performance value.

When calculating the authentication performance value (points) based on the historical data, a method for integrating points may be either addition method or multiplication method provided that the level of integrated points corresponds with the level of the authentication performance values (points) of the other authentication methods. Methods for calculating the authentication performance value (points) based on the historical data can be adequately designed by the ordinal skilled person in the art and are not limited to those described in the specification. As for the calculation of the authentication performance value (points) based on user's behavioral patterns as the historical data, one may refer to an idea of weighting disclosed in Patent Document 4.

The first authentication performance value obtained based on the initial input information may include an authentication performance value of one or more authentication methods other than the historical data authentication among a plurality of authentication methods stored in the authentication performance table. In this regard, the first authentication performance value may be calculated by integrating an authentication performance value (other than the historical data authentication) which can be calculated in association with the initial input information. For example, when the initial input information includes "ID+password", the first authentication performance value may be calculated by adding the authentication performance value (100 points) of "ID+password" to the authentication performance value of the historical data authentication.

If the first authentication performance value calculated by additional authentication determining means satisfies the predetermined authentication performance threshold value required for authentication of a person, that is, if a design of the system allows the first authentication performance value to exceed the authentication threshold value and if the first authentication performance value obtained exceeds the authentication performance threshold value, the additional authentication determining means is not necessary and authenticate a person without requiring the additional authentication. Thus, the additional authentication performance value obtaining means comprises the additional authentication determining means which determines whether or not the additional authentication is necessary by comparing the first authentication performance score and a predetermined score required for authentication of a person.

Additional authentication menu presenting means creates an additional authentication menu which is to be presented and allows selecting one authentication or a combination of authentications from a plurality of authentication methods to satisfy the additional authentication performance value, and presents the created menu. The authentication method which was used for calculating the first authentication performance score is not used to create the additional authentication menu and not presented in the additional authentication menu. A common additional authentication menu may be created and presented regardless of a level of additional authentication performance value or, alternatively, different additional authentication menus may be created and presented depending to the level of the additional authentication performance value.

Authentication determining means obtains a second authentication performance value by using entered information for the authentication method(s) selected at the user terminal. If a second authentication performance score exceeds an additional authentication score, authentication is conducted. If the second authentication performance score is less than the additional authentication score, authentication is not conducted. In the latter case, an authentication method may be selected again from the beginning or, alternatively, a second additional authentication performance value may be calculated based on the second authentication score and the additional authentication score so that a further authentication method may be selected.

Referring to FIGS. 4 to 7, examples of the additional authentication menu which is created and presented by the additional authentication menu presenting means will be explained. FIGS. 4 to 7 are conceptual views and it is understood by the ordinary skilled person in the art that a screen will be created considering information entry usability by the user in the actual design of the screen.

According to a first aspect, the system calculates an additional authentication performance value at the system side and allows selecting one or more authentication methods to satisfy the value. The first aspect is shown in FIGS. 4 to 6.

Figure 4:
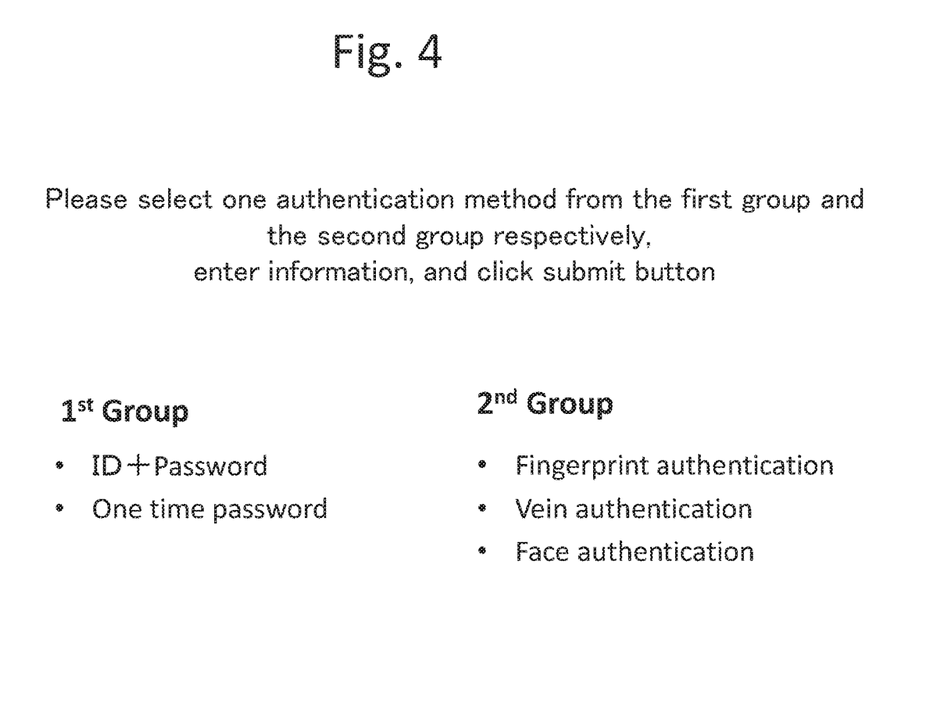
FIG. 4 shows an embodiment of an additional authentication menu displayed on a display of a client terminal.

According to an embodiment shown in FIG. 4, the system prepares a first group (shown in left side) and a second group (shown in right side) at the system side by considering that a combination of one authentication method selected from the first group and another authentication method selected from the second group satisfy the additional authentication performance value, presents "please select one authentication method from the first group and the second group respectively and input information and press sent bottom" at the user side and allows the user to select one authentication method from each group. Here, suppose that 300 points are required as the additional authentication performance value.

The authentication determining means, if both of input information (ID+password, for example) for the selected authentication method from the first group and input information (fingerprint) for the selected authentication method from the second group matches registered information (ID+password, fingerprint) registered in the memory unit of the authentication system, obtains the second authentication performance value by integrating the authentication performance values of the selected authentication methods (100 points+200 points, for example). If only the former information of the selected authentication method does not match, 200 points are gained as the second authentication performance value. If only the latter information of the selected authentication method does not match, 100 points are gained as the second authentication performance value. If both of the information of the selected authentication methods does not match, 0 point is gained as the second authentication performance value.

Figure 5:
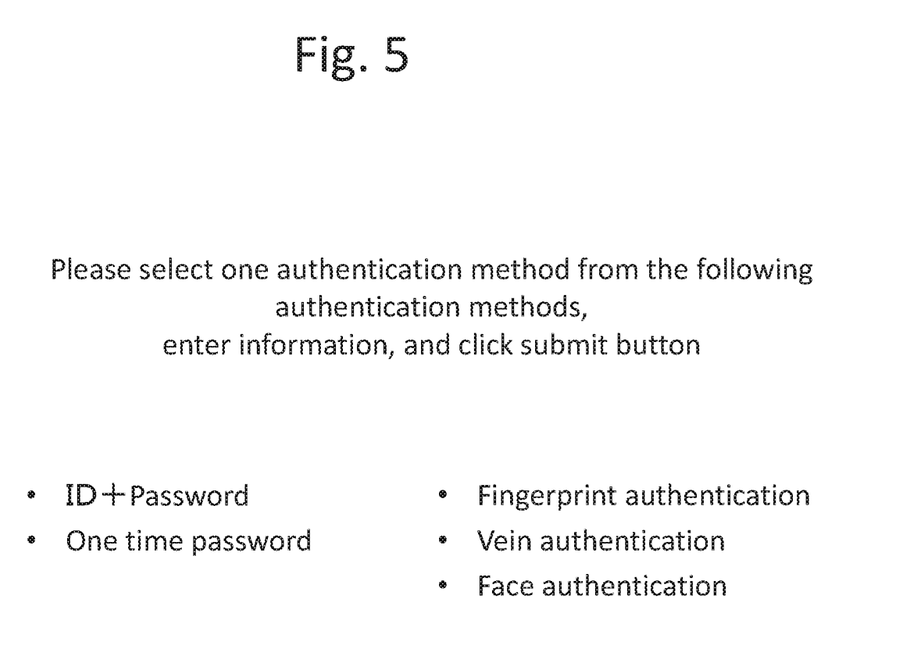
FIG. 5 shows another embodiment of an additional authentication menu displayed on a display of a client terminal.
Figure 6:
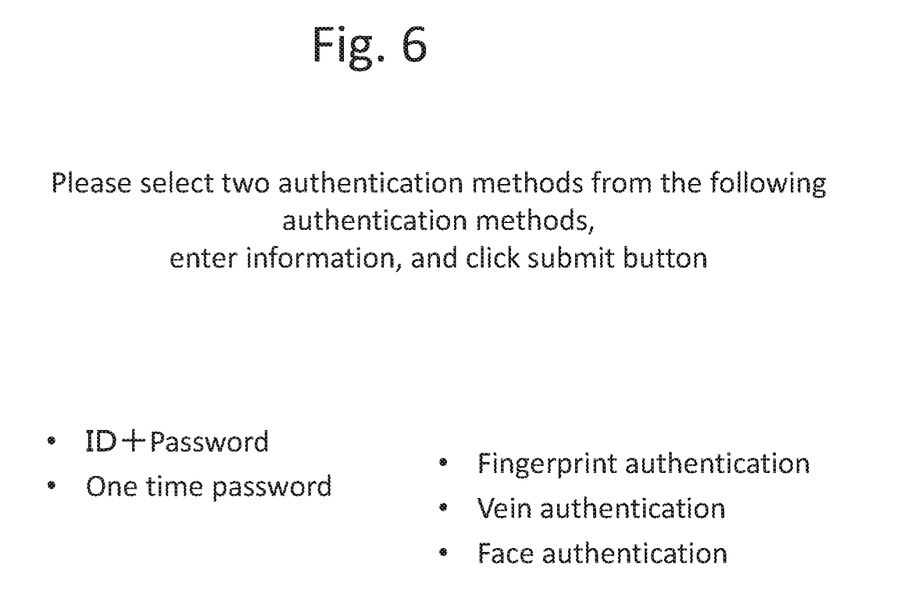
FIG. 6 shows a further embodiment of an additional authentication menu displayed on a display of a client terminal.

According to an aspect shown in FIG. 5, "please select one authentication method from the following authentication methods to enter information, and then click submit button" is presented to the user side, and allows the user to select one authentication method. Here, suppose that 100 points are required for an additional authentication performance value.

If input information (ID+password, for example) for the selected authentication matches registered information (ID+password) registered in the memory unit of the authentication system, 100 points are gained as the second authentication performance value by the authentication determining means, and if it does not match, 0 point is gained as the second authentication performance value by the authentication determining means.

According to an aspect shown in FIG. 6, "please select two authentication methods from the following authentication methods to fill out information, then click submit button" is presented to the user side, and allows the user to select two authentication methods. Here, suppose that 250 points are required as the additional authentication performance value.

If both of input information (ID+password and fingerprint, for example) for the two selected authentication methods matches registered information (ID+password and fingerprint) registered in the memory unit of the authentication system, 300 point are gained as the second authentication performance value by the authentication determining means. If only the former information of the selected authentication method does not match, 200 points are gained as the second authentication performance value. If only the latter information of the selected authentication method does not match, 100 points are gained as the second authentication performance value. If both of information of the selected authentication methods does not match, 0 point is gained as the second authentication performance value.

According to an aspect (not shown) similar to FIG. 6, a plurality of authentication methods (three, for example) may be extracted at the system side where any combinations of two authentication methods from a plurality of authentication methods satisfy the additional authentication performance value, and "please select two authentication methods from the following three authentication methods to fill out information, then click submit button" may be presented to the user side, and may allow the user to select two authentication methods.

According to a second aspect, a required additional authentication performance value and a plurality of authentication methods and their authentication performance values are presented to the user, and allow the user to select one or more authentication methods so as to satisfy the additional authentication performance value. The authentication methods which are created and presented are part or all of the authentication methods registered at the authentication method database. A value presented to the user is not necessary an actually calculated authentication performance value itself (a misidentification rate, for example), but may be an authentication performance value obtained being converted from such value itself. The second aspect is shown in FIG. 7.

Figure 7:
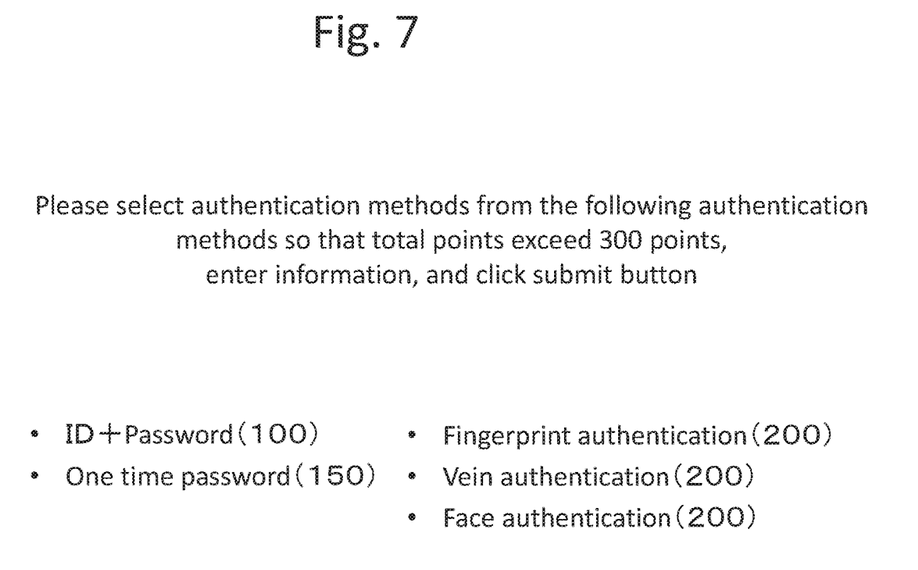
FIG. 7 shows a still further embodiment of an additional authentication menu displayed on a display of a client terminal.

According to the aspect shown in FIG. 7, "please select authentication methods from the following authentication methods so that total points exceed 300 points and enter information, and then click submit button" is presented to the user side, and allows selecting two authentication methods. If both of input information (ID+password and fingerprint, for example) for the two selected authentication methods matches registered information (ID+password and fingerprint) registered in the memory unit of the authentication system, 300 points are gained as the second authentication performance value by the authentication determining means. If only the former information of the selected authentication method does not match, 200 points are gained as the second authentication performance value. If only the latter information of the selected authentication method does not match, 100 points are gained as the second authentication performance value. If both of the information of the selected authentication methods does not match, 0 point is gained as the second authentication performance value.

According to the second aspect, for reducing a burden on the user, when the user selects authentication methods, total points are automatically calculated assuming that the every authentication matches, and an alert is presented prior to sending information for authentication if a selected combination of authentication methods does not satisfy the additional authentication points.

Figure 3:
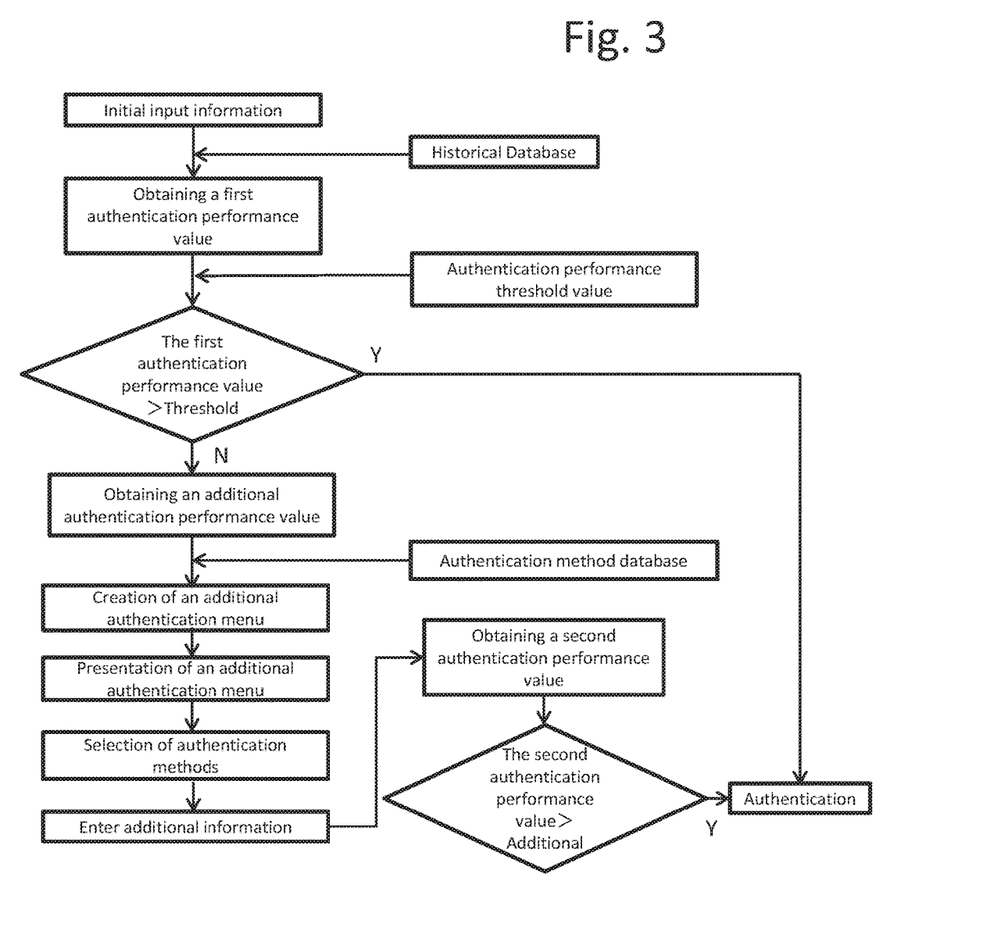
FIG. 3 is a flowchart of an authentication method in accordance with an embodiment of the present invention.

Referring to FIG. 3, a method for authentication using the foregoing authentication system will be explained. When conducting a transaction, a user enters information from the user terminal. The server computer receives the initial input information which comprises the information entered directly from the user terminal and information obtained based on the entered information.

Initial authentication performance value obtaining means obtains a first authentication performance value for each transaction using the historical information of the historical database based on the initial input information at the transaction.

Additional authentication performance obtaining means (additional authentication determining means) determines whether or not additional authentication is required by comparing a predetermined authentication performance threshold value required for authentication of a person and the first authentication performance value.

If the first authentication performance value exceeds the authentication performance threshold value, authentication of a person is conducted without requiring additional authentication. If the maximum value for the first authentication performance value is set not to exceed the authentication threshold value, this step may be omitted.

If the first authentication performance value exceeds the authentication performance threshold value, additional authentication performance value obtaining means obtains an additional authentication performance value based on the authentication performance threshold value and the first authentication performance value.

Additional authentication menu presenting means (additional authentication menu creating means), based on a plurality of authentication methods registered in the authentication method database, creates an additional authentication menu which allows selecting one authentication method or a combination of authentication methods from authentication methods to satisfy the additional authentication performance value.

Additional authentication menu presenting means presents the created additional authentication menu on the display of the client terminal as the additional authentication menu from which one authentication method or a combination of authentication methods can be selected among the authentication methods to satisfy the additional authentication performance value.

At the user side, one or more authentication methods are selected from the additional authentication menu presented on the display of the user terminal, information (additional information) is entered for the selected authentication method(s) and is then sent to the server side.

Authentication determining means obtains a second authentication performance value based on the additional input information (using an authentication performance value for each authentication method registered in the authentication method database), and determines authentication by comparing the obtained second authentication performance value and the additional authentication performance value.

If the second authentication performance values exceeds the additional authentication performance value, authentication is conducted. If the second authentication performance values does not exceed the additional authentication performance value, authentication is not conducted.

Lastly, an operation of the foregoing authentication system will be explained based on a simplified example. At the server side of the authentication system, 300 points are set for the authentication performance threshold value to authenticate a person. A plurality of authentication methods and their points (authentication performance value) for each authentication method are stored in the database of the authentication system. Authentication method "ID+password" is set to 100 points and authentication method "terminal authentication" is set to 100 points. At the server side, the historical date associated with a user is stored and historical data authentication is at first conducted using user's historical data identified by initial input information (credit card number, full name, for example). Contents of transaction (purchase subject, retailer, price and etc., for example) may be used when conducting the historical data authentication. If the historical database stores purchase data in which the number of purchase times is equal to or more than a times and the present transaction has the same purchase pattern, 200 points are given to the first authentication performance value as the historical authentication method points, where "α" and "200 points" are predetermined. At each transaction, the additional authentication performance value required for the additional authentication is calculated. The additional authentication performance value may be a value which is obtained by subtracting the first authentication performance value (historical data authentication performance value) from the authentication performance threshold value and varies depending on a transaction. According to the above example, 100 points are required as the additional authentication performance value.

The authentication system presents a plurality of authentication methods with an authentication performance value of 100 points or more and allows a user to select a desired authentication method. For example, authentication method "ID+password" is set to 100 points, if the user selects authentication method "ID+password" and enters additional information and send it to the server side and if the entered "ID+password" match "ID+password" registered in the server side, 100 points are gained as the second authentication performance value, and authentication is then conducted.

At the beginning of transaction, if the terminal information is sent as the initial input information, authentication method "terminal authentication" which has 100 points is conducted as part of the historical data authentication and authentication may be conducted without requiring additional authentication. In this case, the first authentication performance value is a sum of the historical data authentication performance value (200 points)+the terminal authentication performance value (100 points). Incidentally, if the above 200 points for the historical data authentication method is gained on condition that the information is entered from the same terminal (i.e. the terminal authentication has been conducted), the points for the historical data authentication method may be lowered.

If the purchase pattern of the present transaction is completely different from the purchase patterns in the historical database, the point as the historical data authentication performance value based on the purchase pattern may be zero. At the beginning of transaction, if the terminal information is sent as the initial input information, authentication method "terminal authentication" may be conducted as part of the historical data authentication and the first authentication performance value is equal to the terminal authentication performance value (100 points) as "terminal authentication" is set to 100 points.

In this case, 200 points are required as the additional authentication performance value. The authentication system presents a plurality of authentication methods with an authentication performance value of 200 points or more and allows a user to select a desired authentication method. For example, authentication method "fingerprint authentication" is set to 200 points, if the user selects the authentication method "fingerprint authentication" and enters additional information (fingerprint) and send it to the server side, and if the entered "fingerprint" matches "fingerprint" registered in the server side, 200 points are gained as the second authentication performance value, and authentication is then conducted.

INDUSTRIAL APPLICABILITY

The present invention can be broadly applied to authentication technology on the Internet using a plurality of authentication methods, and its application range is not limited but authentication for an online settlement is illustrated as an example.

The invention claimed is:

1. An authentication system comprising:
   a storage storing a plurality of authentication methods and authentication performance values thereof;
   a first authentication performance value calculator calculating a first authentication performance value for each transaction based on initial input information at each transaction;
   an additional authentication performance value calculator, in response to determination whether or not additional authentication is required to authenticate a person by comparing a predetermined authentication performance threshold value required for authentication of a person and said first authentication performance value, calculating an additional authentication performance value using said authentication performance threshold value and said first authentication performance value if the additional authentication is required;
   an additional authentication menu provider presenting a plurality of authentication methods from which one authentication method or a combination of authentication methods can be selected to satisfy said additional authentication performance value; and
   an authentication determinator, in response to calculation of a second authentication performance value based on said selected one or more authentication methods from the plurality of authentication methods presented by said additional authentication menu provider, determining whether to authenticate by comparing said second authentication performance value and said additional authentication performance value.

2. The authentication system of claim 1 comprising a historical database; and
   said first authentication performance value comprising an authentication performance value of historical data authentication which is obtained based on input information for each transaction and historical information obtained from said historical database.

3. The authentication system of claim 2, wherein said input information comprises identification information of a user terminal, said historical data authentication comprises terminal authentication using user terminal identification information included in the historical information, and said authentication performance value of the historical data authentication comprises an authentication performance value of the terminal authentication.

4. The authentication system of claim 2, if the plurality of authentication methods include an authentication method, other than said historical data authentication, whose authentication performance value can be obtained based on the initial input information, said first authentication value obtained based on said initial input information comprises said authentication performance value obtained based on said initial input information.

5. The authentication system of claim 1, wherein part or all of the authentication performance values of the plurality of the authentication methods are changeable.

6. The authentication system of claim 1, wherein part or all of the authentication performance values for the plurality of the authentication methods are changeable depending on a user.

7. The authentication system of claim 1, wherein said authentication threshold value required for authentication of a person is changeable.

8. A method for authentication comprising the steps of:
   obtaining a first authentication performance value based on initial input information at each transaction;
   determining whether or not additional authentication is required to authenticate a person by comparing the first authentication performance value and an authentication performance threshold value required for authentication of a person;
   if the additional authentication is required, presenting a plurality of authentication methods from which one authentication method or a combination of authentication methods can be selected to satisfy an additional authentication performance value which is obtained using the first authentication performance value and the authentication performance threshold value; and
   obtaining a second authentication performance value based on additional input information using said one or more authentication methods selected from the plurality of presented authentication methods, and determining whether to authenticate by comparing the additional authentication performance value and the second authentication performance value.

9. The method of claim 8, wherein said first authentication performance value comprises an authentication performance value of historical data authentication which is obtained based on input information for each transaction and historical information obtained from historical database.

10. The method of claim 8, wherein said first authentication performance value comprises an authentication performance value of terminal authentication.

11. The method of claim 9, wherein said first authentication performance value comprises an authentication performance value obtained based on the initial input information for an authentication method other than said historical data authentication.

12. An authentication system comprising:
   a storage storing a plurality of authentication methods, authentication performance values thereof and an authentication performance threshold value required for user authentication;
   a first authentication performance value calculator calculating a first authentication performance value for each transaction based on initial input information at each transaction;
   a first authentication determinator determining whether or not additional authentication is required to authenticate a user by comparing said authentication performance threshold value and said first authentication performance value;
   a second authentication performance value calculator, if the additional authentication is required, calculating an additional authentication performance value using said authentication performance threshold value and said first authentication performance value;
   an additional authentication menu provider presenting an additional authentication menu comprising a plurality of authentication methods to the user and allowing the user to select one or more authentication methods from the additional authentication menu and enter additional information;
   a third authentication performance value calculator calculating a second authentication performance value based on said additional information; and
   a second authentication determinator determining whether to authenticate the user by comparing said second authentication performance value and said additional authentication performance value.

13. The authentication system of claim 12, wherein said first authentication determinator authenticates the user if the additional authentication is not required.

14. The authentication system of claim 12, wherein said additional authentication menu is presented on a screen.

15. The authentication system of claim 12, wherein said storage comprises a historical database and said first authentication performance value comprises an authentication performance value of historical data authentication which is obtained based on input information for each transaction and historical information obtained from said historical database.

\* \* \* \* \*